(12) United States Patent
Kohlöffel et al.

(10) Patent No.: US 12,722,796 B2
(45) Date of Patent: Sep. 1, 2026

(54) SYSTEM AND METHOD FOR MONITORING AND/OR DETECTING AN OPERATIONAL STATE OF A MOVABLE COMPONENT OF AN AIRCRAFT

(71) Applicant: Liebherr-Aerospace Lindenberg GmbH, Lindenberg (DE)

(72) Inventors: Christian Kohlöffel, Amtzell (DE); Raphael Ladner, Leutkirch (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 96 days.

(21) Appl. No.: 18/648,076

(22) Filed: Apr. 26, 2024

(65) Prior Publication Data

US 2024/0359821 A1 Oct. 31, 2024

(30) Foreign Application Priority Data

Apr. 27, 2023 (DE) ..................... 10 2023 110 940.5

(51) Int. Cl.
*B64D 45/00* (2006.01)

(52) U.S. Cl.
CPC .... *B64D 45/0005* (2013.01); *B64D 2045/001* (2013.01)

(58) Field of Classification Search
CPC .................................................... B64D 45/005
See application file for complete search history.

(56) References Cited

U.S. PATENT DOCUMENTS 8,814,082 B2 * 8/2014 Schievelbusch ... B64D 45/0005 244/99.2
8,868,261 B2 * 10/2014 Recksiek ........... B64D 45/0005 701/29.2
9,108,724 B2 * 8/2015 Rechsiek ........... B64D 45/0005
11,242,131 B2 * 2/2022 Tzabari ................. B64C 13/503
11,810,478 B1 * 11/2023 Richter .................... G06N 7/01
11,821,325 B2 * 11/2023 Krzywon ................ F03D 17/00
12,110,098 B1 * 10/2024 Ricci Moretti ......... B64C 13/30
12,330,805 B2 * 6/2025 Grom ...................... B64C 13/28
2010/0288886 A1 11/2010 Schievelbusch et al.
2011/0255968 A1 10/2011 Recksiek
2013/0181089 A1 7/2013 Recksiek et al.
2013/0261852 A1 10/2013 Recksiek et al.
2024/0359821 A1 * 10/2024 Kohlöffel ........... B64D 45/0005

FOREIGN PATENT DOCUMENTS

DE 102022133268 A1 6/2024
EP 2681114 B1 8/2018
FR 2983456 A1 6/2013

OTHER PUBLICATIONS

Great Britain Intellectual Property Office, Combined Search and Examination Report under Sections 17 and 18(3) Issued in Application No. GB2405819.0, Apr. 10, 2025, 10 pages.

* cited by examiner

*Primary Examiner* — Michael A Berns
(74) *Attorney, Agent, or Firm* — McCoy Russell LLP

(57) ABSTRACT

The present disclosure relates to a system for monitoring and/or detecting an operational state of a movable component of an aircraft, wherein the system has a movable component and a monitoring device, wherein the system also has a combination sensor connected to the monitoring device, which is designed and arranged to detect a kinematic and/or kinetic state of the component, wherein the monitoring device is designed to monitor and/or detect an operational state of the component.

19 Claims, 1 Drawing Sheet

SYSTEM AND METHOD FOR MONITORING AND/OR DETECTING AN OPERATIONAL STATE OF A MOVABLE COMPONENT OF AN AIRCRAFT

CROSS REFERENCE TO RELATED APPLICATION

The present application claims priority to German Patent Application No. 10 2023 110 940.5 filed on Apr. 27, 2023. The entire contents of the above-listed application are hereby incorporated by reference for all purposes.

TECHNICAL FIELD

The present disclosure relates to a system for monitoring and/or detecting an operational state of a movable component of an aircraft, wherein the system has a movable component and a monitoring device.

BACKGROUND

Sensor systems for monitoring the correct function of control surfaces, in particular on the wings of an aircraft, are known from the prior art. Prior art aircraft are equipped with control surfaces, such as leading-edge slats and landing flaps, to change the aerodynamic properties of the wings.

SUMMARY

Individual flaps of such lift aids are usually driven jointly by a plurality of actuators, wherein the actuators are arranged offset over the flap length and thus drive different parts of the flap.

If the actuators are not synchronised, the flap may skew or even fail completely due to mechanical jamming. The damper may also become disconnected from a structure or actuator.

In known aircraft models from the prior art, disconnect errors between an actuator and the flap are detected during visual inspections. As these are carried out at a certain inspection interval, it is necessary for the actuators to be designed for a higher load, resulting from the disconnect on the other actuator, in combination with the inspection interval, e.g. 10,000 flight cycles, and thus have increased weight.

Aircraft types of newer design or certified according to current certification regulations use sensor systems that can detect disconnect and/or skew faults immediately or during a flight to detect a fault. This is necessary according to current authorisation regulations, as the faults mentioned are faults that can lead directly to a CAT end effect or, in combination with a dormant fault, can result in one.

When position sensors are used, they are preferably installed in such a way that a skew or a jam and/or a disconnect can be detected at all points of the kinematics or the drive system, i.e. on the actuator. This means that they are connected as directly as possible to the flap to be monitored.

When using load sensors, the sensors can be positioned more freely, but they should also measure the aerodynamic forces on the actuator as far as possible. In addition, it must be ensured that no new dormant faults are initiated by the sensor system itself. Furthermore, the fault loads occurring in the flap systems, i.e. in the slat and/or flap systems, can be such that in some situations monitoring based purely on load is very difficult or even impossible.

A disadvantage of the prior art is that the integration of the sensors with direct connection to the structure or flap is complex.

Similarly, not all defects can be optimally covered by the respective systems and the flaps and wing structure must be designed to cover these defects in some cases, which can lead to higher weights.

Dormant faults in the sensor systems themselves are partly covered by maintenance intervals or additional sensors, for example, which incurs costs.

The required resolution of purely position- or load-based systems is sometimes very high and therefore requires expensive sensor technologies.

Not all faults can be covered by very robust monitoring equipment or monitors, which means that the robustness required to cover the safety-critical aspects suffers in some cases.

Against this background, the object of the present disclosure is to improve the above-mentioned system, in particular with regard to system integration.

This object is achieved as described herein.

It is thus provided according to the disclosure that the system also has a combination sensor connected to the monitoring device, which is designed and arranged to detect a kinematic and/or kinetic state of the component, wherein the monitoring device is designed to monitor and/or detect an operational state of the component.

A movable component is understood to mean that the component as a whole or a part of the component is movable.

A kinematic state of the component comprises a position, velocity and/or acceleration of the component or a part of the component.

A kinetic state of the component comprises a load acting on the component or on a part of the component, in particular a force acting on the component and/or a torque acting on the component.

Optionally, it is provided that the operational state comprises or is a skew of the component and/or a disconnect of the component from a structure.

Optionally, it is provided that the monitoring device is designed to monitor the functionality of the combination sensor.

Optionally, it is provided that the monitoring device is designed such that the functionality can be monitored by comparing a kinematic state of the component detected by the combination sensor with a kinetic state of the component detected by the combination sensor.

Optionally, it is provided that the combination sensor comprises a kinematic sensor and a kinetic sensor, wherein the kinematic sensor and the kinetic sensor share an element, for example, a measuring coil, and/or have a common housing in certain areas.

The kinematic sensor and the kinetic sensor can also be designed as separate units and/or be installed in the component, in particular in an actuator.

Optionally, it is provided that the kinematic sensor is a discrete and/or incremental sensor and/or wherein the kinetic sensor is designed to detect a direction of a kinetic state of the component.

The combination sensor has a combination of measuring systems, i.e. a kinematic and a kinetic measuring system. Optionally, both measuring systems have at least one common element.

Optionally, it is provided that the system comprises an actuator, wherein the combination sensor is arranged in or on the actuator and/or wherein there are no combination sensors and/or sensors arranged in the component.

Optionally, it is provided that the component comprises or consists of a lift aid, in particular a leading-edge slat or a landing flap, an actuator and/or a drive train.

Optionally, it is provided that the system comprises a further combination sensor, wherein the monitoring device is designed such that monitoring and/or detecting the operational state of the component and/or monitoring the functionality of the combination sensor and/or the further combination sensor can be performed by comparing a kinematic and/or kinetic state of the component detected by the combination sensor with a kinematic and/or kinetic state of the component detected by the further combination sensor.

Optionally, it is provided that the comparison of a kinematic or kinetic state of the component detected by the combination sensor with a further kinematic or kinetic state of the component detected by the further combination sensor can be performed by converting the kinematic or kinetic state into a kinematic or kinetic state.

Optionally, a kinematic state is compared with a kinetic state by converting the kinematic state into a kinetic state. The conversion can be carried out using the stiffness of the component or of a section of the component. Similarly, a kinetic state can be compared with a kinematic state by converting the kinetic state into a kinematic state.

Other sensors such as position sensors and/or load and/or current sensors can also be used for conversion and/or comparison.

The disclosure also relates to an aircraft, in particular an aeroplane having a system according to the disclosure.

The disclosure also relates to a method for monitoring and/or detecting an operational state of a movable component of an aircraft having a system according to the disclosure, wherein the method comprises the following steps:

- detecting a kinematic and/or kinetic state of a component using a combination sensor,
- monitoring and/or detecting an operational state of the component.

Optionally, it is provided that the operational state comprises or is a skew of the component and/or a disconnect of the component from a structure.

Optionally, it is provided that a disconnect of the component that takes place in front of an area in which the combination sensor is arranged, takes place by detecting a kinematic and kinetic state of the component and a disconnect of the component that takes place behind an area in which the combination sensor is arranged, takes place only by detecting a kinetic state of the component.

The spatial information, such as “in front of” or “behind”, refers to the spatial arrangement on the aircraft.

it is provided that monitoring and/or detecting an operational state of the component is performed by detecting a kinematic state of the component after a kinetic state of the component reaches or exceeds a limit value and/or in that monitoring and/or detecting an operational state of the component is performed by detecting a kinetic state of the component after a kinematic state of the component reaches or exceeds a limit value.

Optionally, the features of the system are mutatis mutandis also features of the method. Optionally, the features of the method are mutatis mutandis also features of the system.

At this point it is pointed out that the terms “a” and “one” do not necessarily refer to exactly one of the elements, although this is a possible embodiment, but can also denote a plurality of the elements. Similarly, the use of the plural also includes the presence of the element in question in the singular and, conversely, the singular also includes several of the elements in question. Furthermore, all of the features of the disclosure described herein may be claimed in any combination or in isolation from each other.

BRIEF DESCRIPTION OF THE FIGURES

Further advantages, features and effects of the present disclosure are shown in the following description of exemplary embodiments with reference to the figures, in which the same or similar components are designated by the same reference numerals. In the figures.

DETAILED DESCRIPTION

Figure 1:
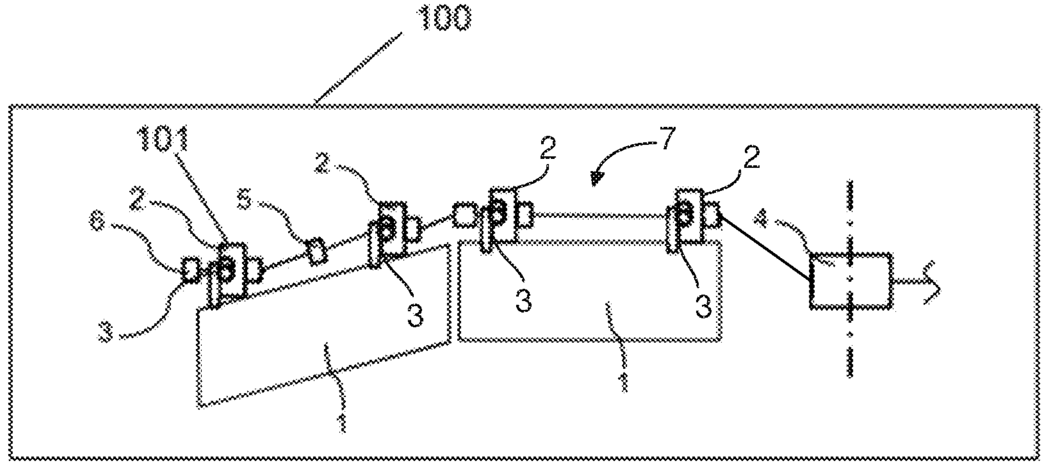
FIG. 1 shows a schematic view of an embodiment of a system according to the disclosure.

FIG. 1 shows a system according to the disclosure with two flaps 1 of an aircraft 100. A flap 1 is driven by two actuators 2. Each actuator 2 has a combination sensor 3. The actuators 2 are driven via a drive train 7, which is driven by a drive unit 4. The drive train 7 has a brake 5. An asymmetry sensor 6 is also provided.

Figure 2:
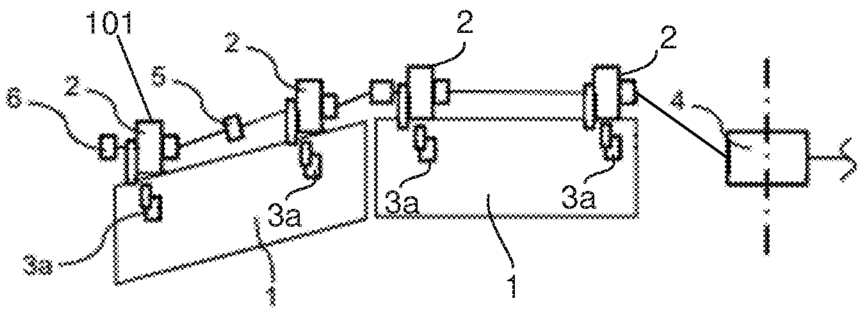
FIG. 2 shows a schematic view of an embodiment of a system from the prior art.

FIG. 2 shows a conversion from the prior art, which has a position sensor **3*a* independently connected to the flap instead of a combination sensor 3**.

In other words, position and torque sensors are combined in one device, i.e. in a combination sensor for monitoring skew and/or disconnect errors in a high-lift system.

Optionally, position and torque sensors are integrated in an actuator and/or in a device at an output. The combination sensor may have a single housing, such as the actuator 2 housing 101.

Optionally, the system has single flap actuators with sensors in the actuator only, without the additional need for sensors on or very close to the flap.

Optionally, information from absolute and/or incremental position sensors and torque sensors is used together to mutually increase the robustness of the monitoring by a control unit of the aircraft having a processor with instructions therein for receiving the output of the combination sensor 3 and monitoring performance of the aircraft components in FIG. 1 in response to the sensor outputs as described herein.

Optionally, the torque information is used to detect a load zero crossing and the information is used to enable incremental sensors with higher resolution and/or less hysteresis.

Optionally, the position and/or load information is used to monitor the correct function of the other sensor type.

It is advantageous to combine two sensor systems, e.g. a load sensor and a position sensor, and to combine the advantages of the respective sensor systems in one concept.

In an advantageous way, the robustness of the skew and/or disconnect monitoring device is increased by using both sets of sensor information.

In an advantageous manner, both sensors are integrated at an easily accessible location that is more accessible than a location at which known position sensors are arranged.

The use of a plurality of sensor technologies has the advantage of reducing the amount of cabling required.

In an advantageous manner, the required resolution of the respective sensors is reduced. For example, a discrete sensor can be used instead of an absolute sensor for position detection and/or a lower resolution can be used for load detection. This is a more cost-effective implementation.

In an advantageous manner, the sensors monitor each other's function and thus exclude or reduce dormant faults, for example my comparing the variation of each sensor's output in real-time to confirm that motion changes correspond with torque changes for proper functioning.

In an advantageous manner, the installation effort during assembly is reduced by combining two sensors.

In an advantageous manner, the accessibility of the sensors to be installed is improved.

In an advantageous manner, the required installation space is reduced.

In an advantageous manner, costs are reduced by sharing components, e.g. a solenoid coil, a plug, a housing and/or cabling.

In an advantageous manner, the robustness of the monitoring functions is increased.

In an advantageous manner, a load reduction is achieved in the actuator and in the affected structure by reducing the forces that occur in the event of a fault.

In an advantageous manner, the sensors, in particular both sensors, monitor each other's function and thus exclude or reduce dormant faults.

The combination sensor is arranged as close as possible to the component, e.g. flap, in particular in order to be able to monitor the event of a disconnect in all necessary components.

The combination sensor is designed and arranged in such a way as to detect and/or limit the required differential angles or loads to the required extent in all relevant skew and/or disconnect conditions.

The combination sensor combines all the functionalities of prior art sensors in one unit and extends them to include load measurement and monitoring of the sensor technology.

The known faults that lead to a skew or a powered skew usually have a fault location in front of the measuring point of torque and/or position of an actuator. Therefore, the monitoring of skew errors can be carried out via the two sensors in particular or together in combination. Optionally, the resolution of the monitoring can be increased or the robustness can be increased by using the sensor information, in particular from both sensors.

Optionally, all faults are detected in front of the measuring point in the actuator via position-based and/or torque-based measurements. All faults that occur behind the measuring point are recognised via pure torque measurement. Here too, the robustness and resolution of the combination sensor can be advantageous.

The robustness as well as the recognisability of error cases can be increased by introducing a combined monitoring of both values. For example, load difference monitoring can only be activated if the difference angles are greater than a certain value.

This can also be the case in reverse, i.e. differential angle monitoring is only activated when a minimum load is present. By combining both measuring principles, depending on the current position, a more robust limit value can be defined for each of the individual monitoring devices without exceeding the required target values.

Optionally, in the case of independent measuring principles, it is therefore also possible to compare both sensor values and/or sensor differences of a flap or the opposing wings with each other or the deviation from the measured position (APPU, PPU) and thus to make a statement about the function of the sensors via a correlation of the differences and/or deviations. When converting the differential position via the stiffness to a load, the values of the position sensors can thus be compared to the values of the torque sensors.

With incremental measuring systems, the achievable accuracy is also influenced by the occurring clearances and stiffnesses. Higher accuracy can be achieved with these systems if the additional information on load direction is available. This advantage can therefore have a significant impact and enable the benefit of cost-effective incremental systems.

It is particularly advantageous if the combination sensor is designed in such a way that parts of the measuring systems can be used together in the combination sensor, thus enabling the functionality of certain function groups to be checked. For example, the same measuring coil can be used for torque and position measurement.

The selection of the position of the sensors, e.g. input or output, can also be changed by combining the sensors, which would not be possible if only one sensor principle were used due to an independent connection to the structure. This means that the combination sensor can only be arranged in the actuator and no other sensors can be arranged in the structure, i.e. in moving parts.

The invention claimed is:

1. System for monitoring and/or detecting an operational state of a movable component of an aircraft, wherein the system comprises the movable component and a monitoring device, wherein the system also has a combination sensor connected to the monitoring device, which is configured to and arranged to detect a kinematic state and/or a kinetic state of the movable component, wherein the combination sensor comprises a kinematic sensor and a kinetic sensor, wherein the kinematic sensor and the kinetic sensor share a measuring coil, wherein the monitoring device is configured to monitor and/or detect the operational state of the movable component, wherein the kinematic state comprises a position, a velocity, and/or acceleration of the movable component, and wherein the kinetic state comprises a load acting on the movable component.

2. System according to claim 1, wherein the movable component is a flap, and wherein the operational state comprises or is a skew of the flap and/or a disconnect of the flap from a structure.

3. System according to claim 1, wherein the monitoring device is configured to monitor a functionality of the combination sensor.

4. System according to claim 3, wherein the monitoring device is configured such that the functionality can be monitored by comparing the kinematic state of the movable component detected by the combination sensor with the kinetic state of the movable component detected by the combination sensor.

5. System according to claim 1, wherein the kinematic sensor is a discrete and/or incremental sensor, and/or wherein the kinetic sensor is configured to detect a direction of the kinetic state of the movable component.

6. System according to claim 1, wherein the system comprises an actuator, wherein the combination sensor is arranged in or on the actuator, and wherein there are no combination sensors and/or sensors arranged in the movable component.

7. System according to claim 6, wherein the kinematic sensor and the kinetic sensor are positioned in a housing of the actuator.

8. System according to claim 1, wherein the movable component comprises or consists of a lift aid.

9. System according to claim 1, wherein the system comprises a further combination sensor, wherein the monitoring device is configured such that monitoring and/or detecting the operational state of the movable component and/or monitoring a functionality of the combination sensor and/or the further combination sensor can be performed by comparing the kinematic and/or the kinetic state of the movable component detected by the combination sensor with a further kinematic and/or a further kinetic state of the movable component detected by the further combination sensor.

10. System according to claim 9, wherein the comparison of the kinematic state or the kinetic state of the movable component detected by the combination sensor with the further kinematic or the further kinetic state of the movable component detected by the further combination sensor can be performed by converting the kinematic state into the kinetic state, or by converting the kinematic state into the kinetic state.

11. Aircraft, having a system according to claim 1.

12. System according to claim 1, wherein a component shared by the kinematic sensor and the kinetic sensor share is only and exactly the measuring coil.

13. System according to claim 12, wherein the kinematic sensor and the kinetic sensor have a common housing for one or more of a leading-edge slat, a landing flap, an actuator, and a drive train.

14. System according to claim 1, wherein the kinematic sensor and the kinetic sensor are positioned in a single housing.

15. System according to claim 1, wherein the kinetic state comprises a force acting on the movable component and/or a torque acting on the movable component.

16. Method for monitoring and/or detecting an operational state of a movable component of an aircraft having a system comprising the movable component and a monitoring device, wherein the system also has a combination sensor connected to the monitoring device, which is configured to and arranged to detect a kinematic state and/or a kinetic state of the movable component, wherein the combination sensor comprises a kinematic sensor and a kinetic sensor, wherein the kinematic sensor and the kinetic sensor share a measuring coil, and wherein the monitoring device is configured to monitor and/or detect the operational state of the movable component, wherein the method comprises the following steps:

detecting the kinematic and/or the kinetic state of the movable component using the combination sensor, monitoring and/or detecting the operational state of the movable component, wherein the kinematic state comprises a position, a velocity, and/or acceleration of the movable component, and wherein the kinetic state comprises a load acting on the movable component.

17. Method according to claim 16, wherein the movable component is a flap, and wherein the operational state comprises or is a skew of the flap and/or a disconnect of the flap from a structure.

18. Method according to claim 16, wherein a disconnect of the movable component that takes place in an area in front of the combination sensor takes place by detecting the kinematic and the kinetic state of the movable component, and wherein a disconnect of the movable component that takes place in a further area behind the combination sensor takes place only by detecting the kinetic state of the movable component.

19. Method according to claim 16, wherein monitoring and/or detecting the operational state of the movable component is performed by detecting the kinematic state of the movable component after the kinetic state of the movable component reaches or exceeds a limit value and/or in that monitoring and/or detecting the operational state of the movable component is performed by detecting the kinetic state of the movable component after the kinematic state of the movable component reaches or exceeds the limit value.

* * * * *